(12) United States Patent
Jackson et al.

(10) Patent No.: US 10,589,389 B2
(45) Date of Patent: Mar. 17, 2020

(54) APPARATUS AND METHOD FOR COOLING A HARD METAL APPLIED TO THE SURFACE OF A METAL ALLOY SUBSTRATE

(71) Applicant: LIQUIDMETAL COATINGS, LLC, Lake Forest, CA (US)

(72) Inventors: Hewy E. Jackson, Spring, TX (US); Choongnyun Paul Kim, Northridge, CA (US); John Kang, Coto De Caza, CA (US)

(73) Assignee: LIQUIDMETAL COATINGS, LLC, Lake Forest, CA (US)

(*) Notice: Subject to any disclaimer, the term of this patent is extended or adjusted under 35 U.S.C. 154(b) by 453 days.

(21) Appl. No.: 15/490,739

(22) Filed: Apr. 18, 2017

(65) Prior Publication Data

US 2017/0320173 A1    Nov. 9, 2017

Related U.S. Application Data

(60) Provisional application No. 62/324,116, filed on Apr. 18, 2016.

(51) Int. Cl.
| | | |
|---|---|---|
| *B23K 37/00* | (2006.01) | |
| *B23K 9/04* | (2006.01) | |
| *B23K 9/32* | (2006.01) | |
| *B23K 103/04* | (2006.01) | |

(52) U.S. Cl.
CPC ............ *B23K 37/003* (2013.01); *B23K 9/046* (2013.01); *B23K 9/32* (2013.01); *B23K 2103/04* (2018.08)

(58) Field of Classification Search
CPC ........ B23K 37/003; B23K 9/046; B23K 9/04; B23K 9/048
See application file for complete search history.

(56) References Cited

U.S. PATENT DOCUMENTS

| | | | |
|---|---|---|---|
| 1,806,954 A | | 5/1931 | Schmitz, Jr. et al. |
| 2,189,595 A | * | 2/1940 | Smith .................. B23K 31/025 |
| | | | 427/592 |
| 2,357,170 A | | 8/1944 | Burggraf |

(Continued)

FOREIGN PATENT DOCUMENTS

| | | | |
|---|---|---|---|
| JP | 61123478 A | * | 6/1986 |
| JP | 04288991 A | * | 10/1992 |

(Continued)

OTHER PUBLICATIONS

Thirugnanam, M., "Modern High Pressure Die-Casting Processes for Aluminium Castings", Transaction of Indian Foundry Congress, vol. 61, pp. 1-7, 2013.

*Primary Examiner* — Geoffrey S Evans
(74) *Attorney, Agent, or Firm* — Dave Law Group, LLC; Raj S. Dave

(57) ABSTRACT

An apparatus and related method for cooling a hard metal applied in a molten or semi-molten state to the surface of a metal substrate employ a chill block chilled by a cryogenic coolant conducted through a coolant passage in the chill block with at least one ejector port in communication with the coolant passage arranged to eject cryogenic coolant from the chill block onto the hand metal for further cooling the hard metal. An alloy steel substrate preheated to 300 to 600 degrees Fahrenheit has a hard metal applied thereto by an arc welding process.

20 Claims, 3 Drawing Sheets

(56) References Cited

U.S. PATENT DOCUMENTS

| | | | |
|---|---|---|---|
| 2,395,723 A | | 2/1946 | Chmielewski |
| 3,089,950 A | | 5/1963 | Stephen |
| 3,435,180 A | | 3/1969 | Kershaw |
| 4,431,902 A | * | 2/1984 | Wallen .................. B23K 9/048 219/125.12 |
| 4,511,539 A | | 4/1985 | Stephenson |
| 5,293,026 A | | 3/1994 | Dennis et al. |
| 5,376,213 A | | 12/1994 | Ueda et al. |
| 5,777,259 A | | 7/1998 | Mennucci et al. |
| 5,881,208 A | | 3/1999 | Geyling et al. |
| 5,942,289 A | * | 8/1999 | Jackson ................. B23K 9/046 427/398.2 |
| 6,280,681 B1 | | 8/2001 | MacRae |
| 6,375,895 B1 | * | 4/2002 | Daemen ............... B23K 35/308 148/519 |
| 6,591,894 B2 | | 7/2003 | Guha et al. |
| 8,052,923 B2 | * | 11/2011 | Langlet ................. B22F 3/1055 148/513 |
| 2005/0016710 A1 | | 1/2005 | Malterer |
| 2013/0206742 A1 | * | 8/2013 | Brueckert ............. B23K 31/02 219/136 |
| 2014/0263577 A1 | * | 9/2014 | Simpson ............. B23K 1/0018 228/103 |

FOREIGN PATENT DOCUMENTS

| | | | |
|---|---|---|---|
| RU | 2041785 C1 | * 8/1995 | |
| WO | WO-2008124886 A1 | * 10/2008 | ............ B23K 9/048 |

\* cited by examiner

APPARATUS AND METHOD FOR COOLING A HARD METAL APPLIED TO THE SURFACE OF A METAL ALLOY SUBSTRATE

This present application claims priority to U.S. Provisional Application Ser. No. 62/324,116, filed Apr. 18, 2016, which is hereby incorporated by reference in its entirety.

BACKGROUND

Technical Field

The disclosure relates to an apparatus and a method of using the apparatus to improve the application of hard metal to a metal alloy substrate.

Description of Related Art

The application of a hard metal to an alloy steel substrate according to a known method requires that the substrate be preheated to a certain temperature in the range of approximately 300° F. to approximately 600° F. (inclusive). The substrate has a limit as to the temperature the substrate should reach during the welding application of the hard metal to the surface of the substrate. Also, there are important benefits to keeping the substrate as near the prescribed preheat temperature as possible. Use of an arc welding process, for example, to apply the hard metal to the surface of the alloy steel substrate causes the temperature to rise at a rapid rate during the welding process. This may cause the temperature of the substrate to reach or exceed the maximum allowable temperature, unless the welding process is interrupted. Temperatures above the maximum allowable temperature may also unduly increase the size of the weld puddle and resultant weld bead, and the depth of the weld heat-affected zone in the substrate.

SUMMARY

An aspect of the present disclosure is to provide an improved apparatus and method for cooling a hard metal applied to the surface of a metal alloy substrate which addresses or solves these problems.

In one aspect, the apparatus of the disclosure for cooling a hard metal applied in a molten or semi-molten state to the surface of a metal substrate in accordance with an example embodiment as disclosed herein includes a chill block formed of a heat-conducting material. A contact surface is provided on the chill block for contacting the hard metal applied on the surface of the metal substrate for cooling the hard metal. A coolant passage in the chill block conducts a cryogenic coolant through the chill block to cool the chill block. At least one ejector port in the chill block in communication with the coolant passage ejects cryogenic coolant from the chill block onto the hard metal for further cooling the hard metal.

In an embodiment, the heat conducting material of the chill block is copper and the cryogenic coolant is liquid nitrogen. In an embodiment, the protrusion and contact surface each have a width equal to or greater than a width of hard metal to be cooled. In an embodiment, the at least one ejector port is located on one side of the protrusion and on a second, opposite side of the protrusion, an application of hard metal on the workpiece may take place. The contact surface may be rounded or chamfered.

Another aspect of this disclosure provides a method for cooling a hard metal applied on a surface of a metal substrate, the method including: applying a molten or semi-molten hard metal on a surface of a metal substrate, and rapidly cooling the hard metal applied on the metal substrate utilizing the apparatus of the disclosure as disclosed herein, wherein a cryogenic coolant is conducted through the coolant passage in the chill block while the contact surface of the chill block is in contact with the hard metal with cryogenic coolant being ejected from the at least ejector port in the chill block onto the hard metal for further cooling the hard metal applied.

Yet another aspect of this disclosure includes a method wherein a workpiece is preheated to a temperature within the range of approximately 300° F. to approximately 600° F. (inclusive), the hard metal is applied to the surface of the preheated alloy steel substrate as a weld bead applied by an arc welding process, and the welding bead is rapidly cooled utilizing the apparatus of the disclosure, wherein a cryogenic coolant is conducted through the coolant passage in the chill block while the coolant surface of the chill block is in contact with the weld bead and wherein cryogenic coolant is ejected from the at least one ejector port in the chill block onto the weld bead.

Other aspects and features of this disclosure including the apparatus and method for cooling will be apparent to those skilled in the art upon examination of the following disclosure of example embodiments with reference to the accompanying drawings.

DETAILED DESCRIPTION OF EMBODIMENTS

Figure 1:
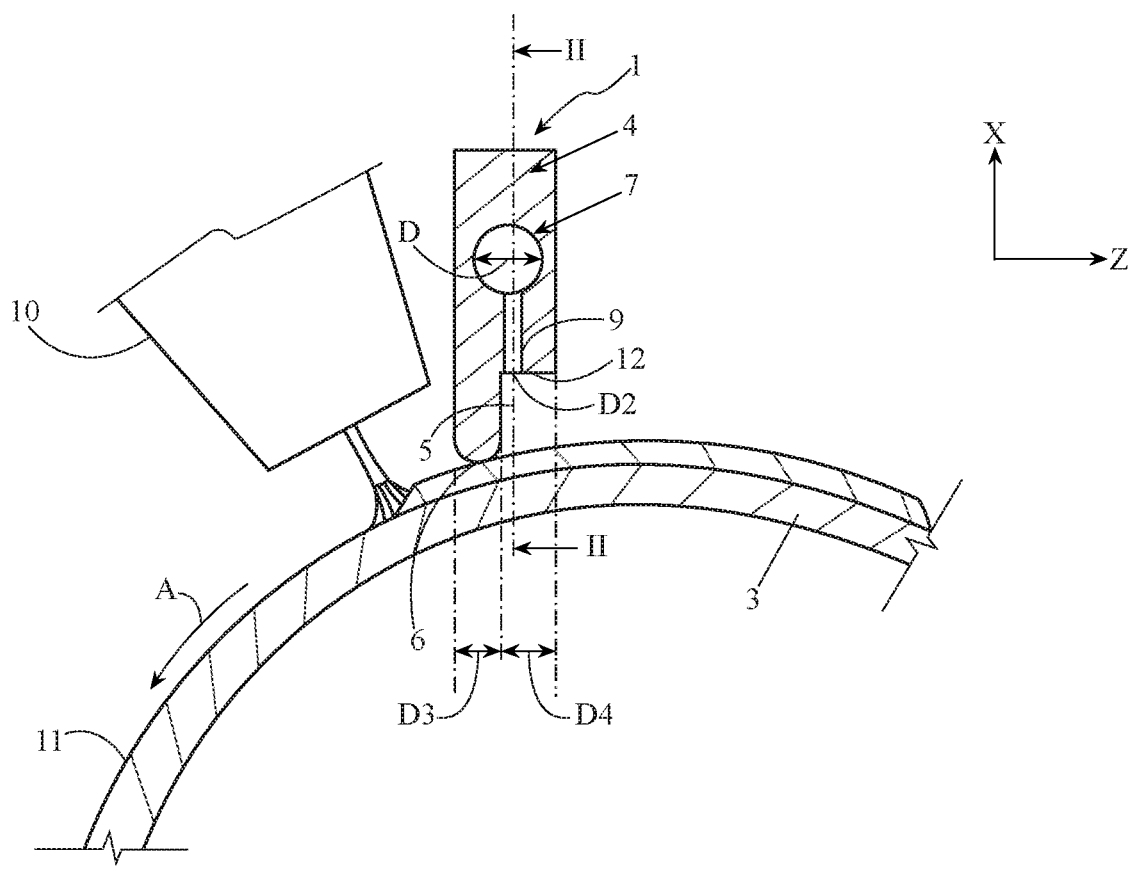
FIG. 1 is a schematic, partial sectional view of an apparatus for cooling a hard metal applied to a workpiece taken along line I-I in FIG. 2, along with a welding gun, in accordance with an embodiment.
Figure 2:
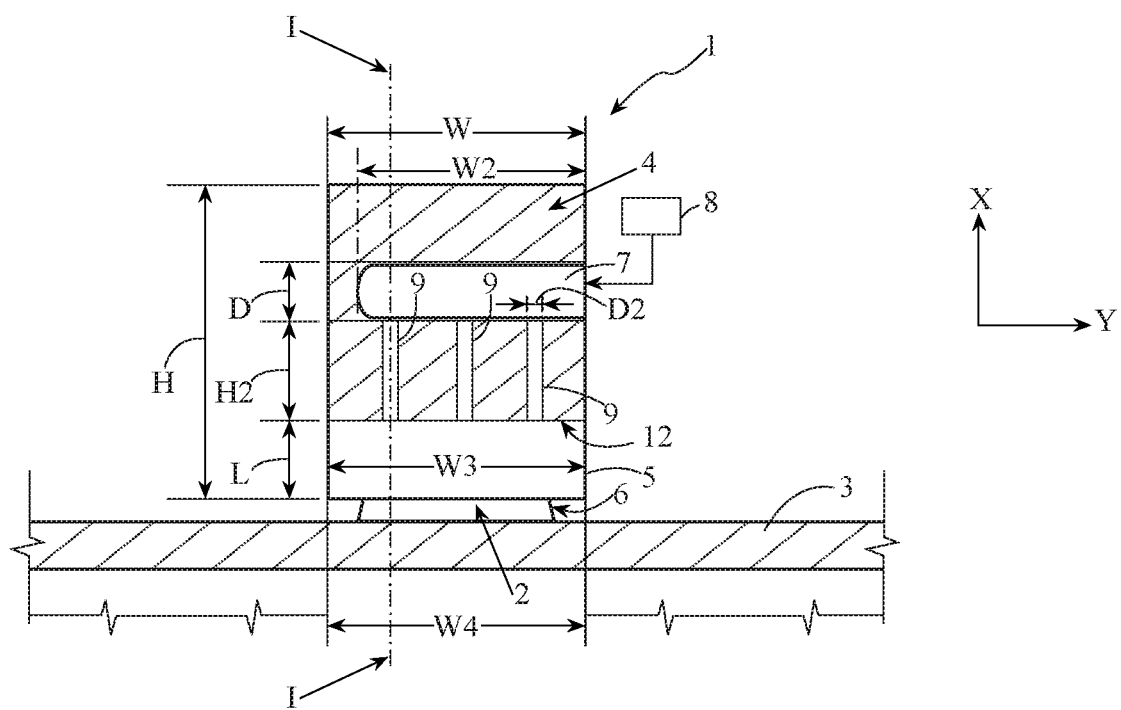
FIG. 2 is a schematic, cross-sectional view of the apparatus of FIG. 1 taken along line II-II in FIG. 1.
Figure 3:
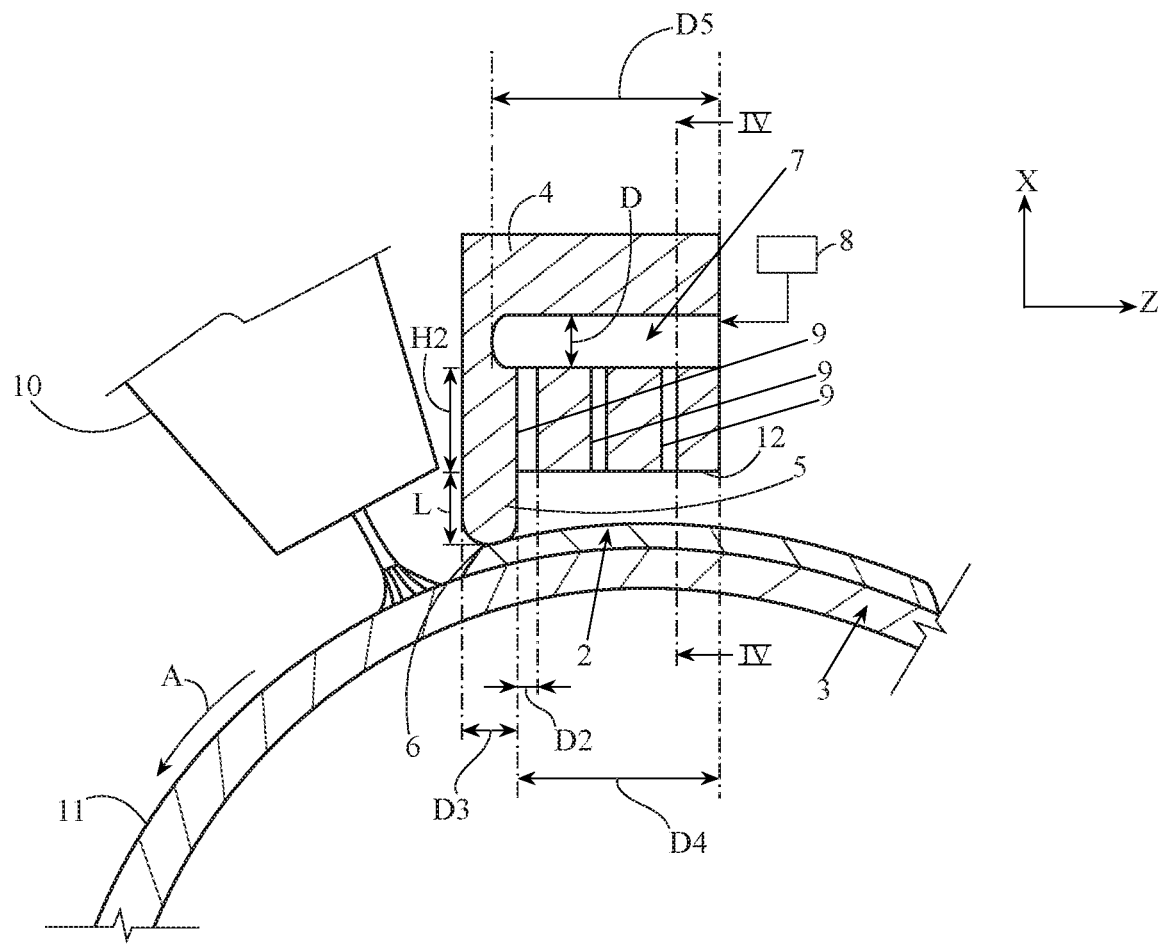
FIG. 3 is a schematic, partial sectional view of an apparatus for cooling a hard metal applied to a workpiece taken along section line in FIG. 4, along with a welding gun, in accordance with another embodiment.
Figure 4:
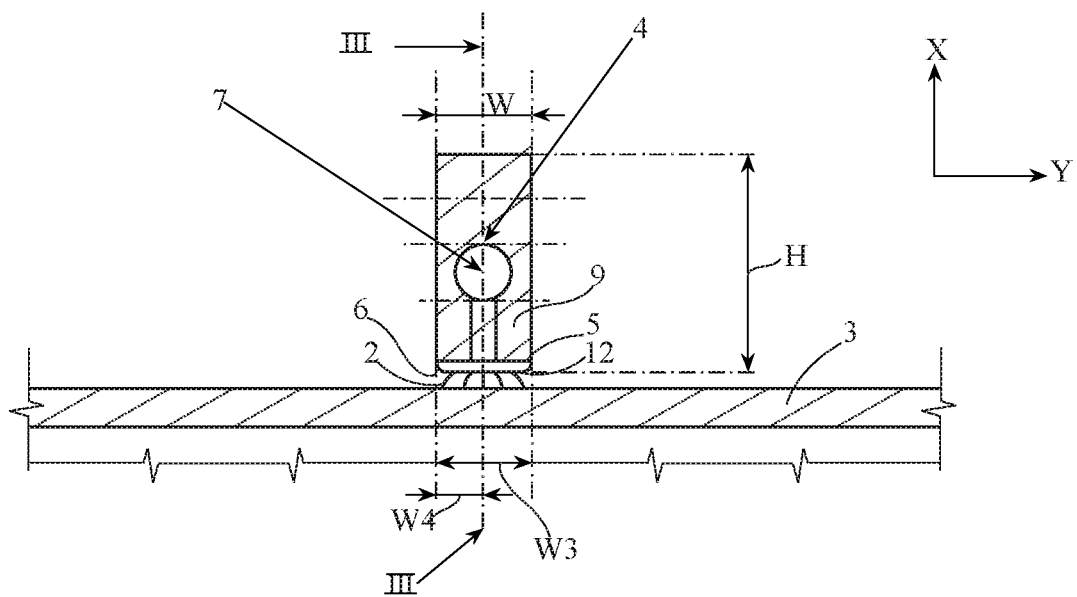
FIG. 4 is a schematic, cross-sectional view of the apparatus of FIG. 3 taken along the line IV-IV in FIG. 3.

Referring now to the drawings, FIGS. 1 and 2 illustrate one embodiment of an apparatus 1 for cooling a hard metal 2 applied to a workpiece 3. FIGS. 3 and 4 illustrate another embodiment of an apparatus 1A for cooling a hard metal 2 applied to a workpiece 3. As described in greater detail later, in either embodiment, the hard metal 2 may be applied using a welding gun 10 in the form of a weld bead to an exterior surface 11 of the workpiece 3. The apparatus 1 (and apparatus 1A) is positioned adjacent to the welding gun 10.

The apparatus 1 (and apparatus 1A) is designed to cool the hard metal 2 applied in a molten or semi-molten state to the surface 11. The apparatus 1 (and 1A) includes a chill block 4 formed of a heat-conducting material having a high thermal conductivity that receives coolant (e.g., cryogenic coolant, water, etc.) from a coolant source 8. As further explained herein, copper is the heat-conducting material used to manufacture chill block 4 in the example embodiment, but other heat conducting material(s) that are similar to copper that are sufficiently cooler than molten or semi-molten hard metal/alloy (e.g., with the addition of cooling via water, fluid, gas, etc.) for heat absorption therefrom, such as aluminum or other material, could be employed.

As shown in the embodiment of FIGS. 1 and 2, the chill block 4 comprises a body having a first portion and a second portion. The body of the chill block 4 has an overall width W (in a lateral or Y-direction) and a height H (in a vertical or X-direction) (see FIG. 2) and a depth (in the longitudinal or Z-direction) or length (see FIG. 1). The second portion of the body includes a protrusion 5 depending or extending from the first portion, as shown in FIGS. 1 and 2. The protrusion may be a solid portion that extends below ports 9 (described later). The protrusion 5 extends a length L (see FIG. 2) below a lower surface 12 (see FIG. 1) of the first portion of the body (the length L being measured in the vertical direction from a proximal end at the lower surface 12 to its distal end). The lower surface 12 has a width that may be equal to width W and a depth D4 (see FIG. 1) in the body of the chill block 4. The protrusion 5 has a width W3 extending in the lateral (or Y-) direction and a depth D3 extending in the longitudinal (or Z-) direction (see FIG. 1). In an embodiment, the width W3 of the protrusion 5 may be the same as or substantially equal to the width W of the chill block 4. In another embodiment, the width W3 is different than the width W of the chill block 4. In an embodiment, the body of the chill block 4 has an overall depth equal to the sum of depth D3 of protrusion 5 and depth D4 of the lower surface 12.

The protrusion 5 has a contact surface 6 at its distal end for contacting the hard metal 2 applied on the surface 11 of the workpiece 3 for cooling the hard metal. In addition to assisting with the cooling of the metal through contact, contact surface 6 also smooths and/or distributes the hard metal 2 on the surface 11. In accordance with embodiments, the contact surface 6 is rounded or chamfered at least in part in a direction permitting relative movement of the contact surface 6 and the surface of the hard metal 2 being cooled, e.g., in the direction that the contact surface 6 slides over the hard metal 2 relative to the workpiece 3 when the workpiece is moved in the direction as indicated by arrow A (see FIG. 1). The contact surface 6 also has a width W4. In an embodiment, the width W4 of the contact surface 6 is equal to or substantially equal to the width W3 of the protrusion 5. In another embodiment, the width W4 is less than the width W3 of the protrusion. In one embodiment, the width W3 and/or width W4 of the protrusion 5 and/or contact surface 6 (respectively) is substantially equal to and/or greater than a width of the hard metal 2 to be cooled.

The first and second portions of the chill block 4 may be integrally formed together (e.g., molded) as one-piece, or may be parts that are connected together during manufacturing to form an integral body. In one embodiment, the chill block 4 may be formed from two halves or two molded portions that are later joined together.

A coolant passage 7 is formed in the first portion of the body of the chill block 4. The coolant passage 7 is configured for receiving (e.g., through an associated opening or inlet) and conducting a cryogenic coolant from the coolant source 8 through the chill block 4 in order to cool the body of the chill block. The coolant passage 7 extends laterally within the body of the chill block 4 (e.g., in the Y-direction in FIG. 2) and has a width W2 that extends through and along at least the first portion of the body. The opening of the coolant passage 7 has a length or a diameter D for conducting the received coolant. As shown in FIG. 1, the protrusion 5 extends below the coolant passage 7.

One or more ejector ports 9 are also provided in the body of the chill block 4. In accordance with an embodiment, the ejector ports 9 are open passages for directing delivery of coolant from the coolant source 8. The ejector port(s) 9 are provided in the first portion of the chill block 4 and are configured to communicate with the coolant passage 7, as shown in FIG. 2. Multiple ejector ports may be provided in the chill block 4, e.g., in a series. Each of the ejector ports 9 extends in a vertical direction (e.g., in the X-direction) from the coolant passage 7 towards a bottom of the chill block 4 (e.g., towards protrusion 5). The series of ejector ports 9 are also spaced from one another in a direction across a width W of the chill block 4 and a weld bead of the hard metal 2. As shown in FIG. 2, for example, multiple ejector ports 9 may be relatively and spaced in the lateral direction (Y-direction) in a row along the width W of the chill block 4 (e.g., within its first portion). The ports 9 may be evenly spaced relative to one another, or have a substantially equal distance therebetween. The contact surface 6 of the protrusion 5 is positioned and extends below the outlet port of the ejector port(s) 9.

In accordance with an embodiment, the ejector port(s) 9 are located on one side of the protrusion 5 (e.g. a trailing side or a back side of the protrusion 5, or a side that is away or distal from a front side of the protrusion that is near or adjacent the welding gun 10). An application of hard metal 2 on the workpiece 3 takes place on a second side of the protrusion 5 that is opposite to the one side (e.g., the front side of the protrusion 5, that is adjacent to the gun 10) beneath the welding gun 10. Thus, the protrusion 5 serves as a shield to prevent any gas from the cryogenic coolant ejected from the ejector ports 9 during hard metal cooling on one side of the protrusion 5 from mixing with weld shielding gases about the weld puddle beneath the welding gun 10 on the opposite side of the protrusion 5. In accordance with an embodiment, the depth D3 and width W3 of the protrusion 5 may be sized such that it acts as a shield to prevent cross contamination to an opposite side.

Alternatively, it could also be said that the ejector port(s) 9 may be located on one side of the contact surface 6 that is opposite to a second side of the contact surface wherein hard metal is applied.

Each of the ejector ports 9 has a receiving, inlet port in communication with the (lateral) opening of the coolant passage 7, a vertical passageway, and a delivery or outlet port in the lower surface 12 of the chill block 4 that faces the hard metal 2 being cooled on workpiece 3. Each of the ejector ports 9 has a height H2 (measured from the inlet port to the outlet port) and a diameter D2 (or width). The outlet port of each of the ejector ports 9 allows for ejecting of the cryogenic coolant from the coolant passage 7 of the chill block 4 onto the hard metal 2, for further cooling of the hard metal.

In one embodiment, a control device is associated with the coolant source 8. For example, a valve may be provided at the coolant source 8 and/or before the connection to deliver coolant to the coolant passage 7 (e.g., in a delivery tube or pipe), to assist in controlling the amount of, and timing of the delivery of, coolant to the coolant passage 7 (and through the ejector ports 9) of the chill block 4. In another embodiment, one or more valves may be associated with the chill block 4 itself. For example, a one-way valve may be provided in, on, or adjacent to the chill block 4.

Any number of ejector ports 9 may be provided in the chill block 4. In an embodiment, the number, diameter D2, and/or spacing of the ejector ports 9 within the chill block 4 may be based on the dimensions or sizes (e.g., width W and/or height H) of the chill block 4 itself.

The openings of the coolant passage 7 and/or ejector ports 9 may be formed in the body of the chill block 4 any number of ways. For example, if the associated portion of the body is molded (e.g., injection molded), the openings of the passage 7 and/or ports 9 may be formed during the molding process. In another embodiment, the openings of the passage 7 and/or ports 9 are machined, e.g., drilled.

In one embodiment, the cryogenic coolant employed in the chill block 4 is liquid nitrogen ($LN_2$). However, in accordance with other embodiments, one or more alternative cryogenic coolants may be utilized with chill block 4. The cryogenic coolant provided to the chill block 4 from source 8 may be a liquid, semi-liquid, or fluid form.

In accordance with an embodiment, the workpiece 3 is a metal substrate. In one embodiment, the workpiece 3 is made of alloy steel. The workpiece 3 may be a cylindrical workpiece, for example, such as a hollow cylindrical pipe. In accordance with an embodiment, the hard metal 2 applied to the exterior surface 11 of the workpiece is an amorphous metal alloy. In the example embodiments, the hard metal 2 is applied by an arc welding process using the welding gun 10, as shown in FIG. 1. The hard metal 2 can be supplied to the welding arc in the form of a wire or powder for deposit in a molten or semi-molten state onto the surface 11 of the workpiece 3 under the protection of a shielding gas, such as helium or argon, for example. In one embodiment, a tungsten electrode, tungsten inert gas (TIG) arc welding process is employed. However, such a welding process is not intended to be limiting. That is, other arc welding processes including plasma spraying, or flame spraying for surfacing or metalizing, could be employed.

In accordance with an embodiment, the welding gun 10 may include similar features as described with reference to the hardfacing apparatus of U.S. Pat. No. 5,942,289, which is hereby incorporated by reference in its entirety. For example, the gun 10 may include, but is not limited to, features such as a deposition head, material source, heat source (e.g., electrode), power supply, as described in the incorporated '289 patent.

The apparatus 1 is designed to take heat out of and from the weld bead (or puddle) from the top side of the bead, rather than have it soak into the substrate (as in prior applications). This is because the contact surface 6 of the protrusion 5 touches the molten weld directly behind the arc at the welding gun 10, preferably while the hard metal weld bend is still molten or at least partially molten. Since the protrusion 5 and/or its contact surface 6 may have a width equal to or greater than the width at the weld bead, an entire surface of the hard metal to be cooled may be contacted and cooled. Also, since the ejector ports 9 are located on only one side of the protrusion 5, the protrusion 5 serves as a shield to prevent the gas from the cryogenic coolant ejected from the ejector ports 9 from mixing with any weld shielding gases about the weld bead or puddle, beneath the welding gun 10.

Welding takes place over the surface 11 of the workpiece 3 as the workpiece 3 is rotated about an axis (e.g., a cylindrical or center axis) in the direction of arrow A (see FIG. 1, rotating counter-clockwise as shown) to progressively, continuously apply the hard metal 2 in the form of a weld bead to the surface of the workpiece 3. The chill block 4 is placed relatively behind the welding gun 10. The contact surface 6 of the protrusion 5 is slid over the hard metal 2 relative to the workpiece 3. The cryogenic coolant (e.g., liquid nitrogen) escaping the ejector ports 9 escapes the chill block 4 directly behind the protrusion 5, so that the coolant is ejected after the hard metal weld bead is applied to the workpiece 3. Since the ejector ports 9 are spaced relatively from one another in a direction across a width of the chill block 4, as shown in FIG. 2, the weld bead of hard metal 2 is more evenly cooled as the workpiece 3 is rotated.

The chill block 4 and the ejector ports 9 therein may be constructed in different shapes for different types of weld beads. For example, the weld bead applied in the embodiment of FIGS. 1 and 2 may be a wide weaved bead (with the ejector ports 9 arranged in a row across the weld bead). In the embodiment of FIGS. 3 and 4, a stringer bead may be applied. Accordingly, apparatus 1A may be used, which includes a series of ports 9 arranged in line with the stringer weld bead.

FIGS. 3 and 4 illustrate features of apparatus 1A in greater detail. Here, the hard metal 2 is applied in molten or semi-molten state in the form of a stringer bead to the surface 11 of workpiece 3 using the welding gun 10. For purposes of clarity and brevity, like elements and components throughout FIGS. 3 and 4 are labeled with same designations and numbering as discussed with reference to FIGS. 1-3. Thus, although not discussed entirely in detail herein, one of ordinary skill in the art should understand that various features associated with the apparatus 1A are similar to those features previously discussed with reference to apparatus 1. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

The chill block 4 in FIGS. 3 and 4 has a body with a first portion and a second portion, like that of FIGS. 1 and 2, and includes protrusion 5 with its contact surface 6. However, the coolant passage 7 extends in a longitudinal direction (Z-direction) within the body of the chill block, as seen in FIG. 3. Accordingly, the coolant passage 7 has a depth D5 that extends between a back side of the chill block 4 and the protrusion 5. The protrusion 5 extends below the coolant passage 7.

Also, the one or more ejector ports 9 in the chill block 4 of FIGS. 3 and 4 extend in the vertical direction (e.g., in the X-direction) from the coolant passage 7 towards a bottom of the chill block 4 (e.g., towards protrusion 5). However, the series of ejector ports 9 are spaced from one another in a longitudinal direction across a depth of the chill block 4. As shown in FIG. 3, for example, multiple ejector ports 9 may be relatively and spaced in the longitudinal direction (Z-direction) in line with the application of the weld bead along the workpiece 3. The ports 9 may be evenly spaced relative to one another, or have a substantially equal distance therebetween. The contact surface 6 of the protrusion 5 is positioned in front of, and extends below, the outlet port(s) of the ejector port(s) 9.

In accordance with embodiments herein, the workpiece 3 is provided in the form of a metal substrate. The metal substrate 3 in the example embodiments is a cylindrical, alloy steel pipe with the hard metal 2 being applied circumferentially, in a progressive, continuous manner to the outer surface 11 of the pipe. However, the metal substrate could have other forms such as a flat sheet or plate, and be formed of other materials than alloy steel. In accordance with embodiments, the hard metal is an amorphous metal alloy. Alternatively, other hard metals may be used.

Figure 5:
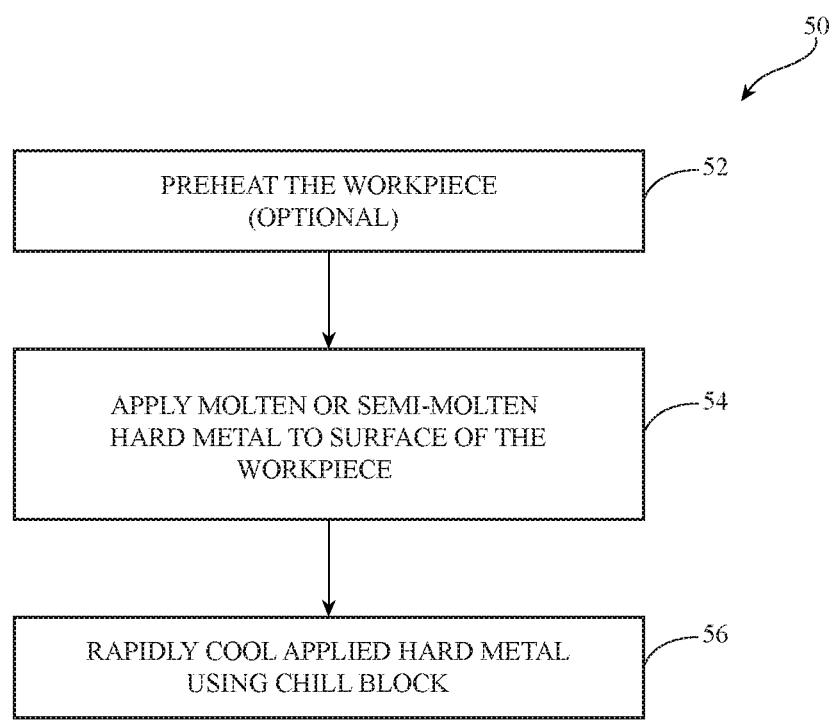
FIG. 5 is a block diagram of steps in a method of using the disclosed apparatus.

FIG. 5 illustrates exemplary steps in a method 50 of using the disclosed apparatus. One method of improving the application of hard metal 2 to the surface 11 of a workpiece 3 utilizing the herein disclosed apparatus 1 and/or 1A includes: at least applying a molten or semi-molten hard metal 2 on a surface 11 of a workpiece 3, as shown at 54 in FIG. 5, and rapidly cooling the hard metal 2 applied on the workpiece utilizing the apparatus 1 or the apparatus 1A, as shown at 56. The cryogenic coolant (e.g., liquid nitrogen) is conducted through the coolant passage 7 in the chill block 4 while the contact surface 6 of the chill block 4 is in contact with the hard metal 2 and cryogenic coolant is ejected from the at least one ejector port 9 in the chill block 4 onto the hard metal 2. The hard metal 2 may be progressively applied on the surface 11 of the workpiece 3. The contact surface 6 may be applied to the hard metal 2 while the hard metal is still at least partially molten or semi-molten to smooth and rapidly cool the hard metal. In some cases, the contact surface 6 of the chill block 4 is in contact with the hard metal 2 immediately after the hard metal 2 is applied to the surface 11.

In an embodiment, the molten or semi-molten hard metal 2 is applied under protection of a shielding gas from the welding gun 10. The cryogenic coolant is ejected from the ejector ports on a side of the contact surface 6 that is opposite a side of the contact surface adjacent the gas-shielded application of the hard metal 2 (the side of the welding gun 10). Accordingly, the protrusion 5 of the chill block 4 serves as a shield to prevent the cryogenic coolant from mixing with the shielding gas.

Optionally, the method 50 may include preheating the workpiece before the hard metal is applied to its surface, shown at 52.

Another method for cooling a hard metal applied on a surface of a workpiece utilizing the apparatus of the disclosure includes preheating the alloy steel substrate to a temperature within the range of approximately 300° F. to approximately 600° F. (inclusive), applying the hard metal to the surface of the preheated alloy steel substrate as a weld bead applied by an arc welding process, and rapidly cooling the weld bead utilizing the apparatus of the disclosure. Cryogenic coolant is conducted through the coolant passage in the chill block while the contact surface of the chill block is in contact with the weld bead and cryogenic coolant is ejected from the at least one ejector port in the chill block onto the weld bead. In accordance with the example embodiments, the steps of applying the weld bead and rapidly cooling the weld bead are performed progressively along the surface of the substrate with relative movement of the chill block along the weld bead as the weld bead is applied by the arc welding process in a continuous manner. In one form of the disclosure, where the weld bead is a wide weaved bead, cryogenic coolant is ejected from ejector ports spaced across the bead. Where the weld bead is a stringer bead, cryogenic coolant is ejected from ejector ports in line with the weld bead.

It has been found that the apparatus and method of the disclosure provide advantages over the existing products and technology in that the welding operation speed can be increased 10 to 15% because of the improved rapid cooling of the hard metal while avoiding interruption of the welding process. Control of the molten metal through the contact of the molten metal with the contact surface of the chill block is much easier with the disclosure. The hard metal being applied will also be harder than the same metal applied in accordance with existing methods and apparatus. Since the hardness of the metal equates to greater benefit, and longer life cycle in case of wear resistant surfacing of a substrate, it makes the operation in accordance with the disclosure more cost effective. Where an annular band of hard metal is applied about a cylindrical metal substrate, the entire band will be much flatter, making more bearing area from the beginning of the use cycle. The appearance of the hard metal applied on the metal substrate is also made more consistent, and pleasing to the eye. The apparatus and method for cooling in accordance with the disclosure are designed to take the heat out of the weld puddle from the top side rather than have it soak into the substrate. Control of the weld puddle is greatly enhanced, resulting in a more uniform weld bead and limiting the depth of the weld heat-affected zone in the substrate. In accordance with the example embodiment, the weld metal reacts opposite that of the alloy steel substrate. Rapid cooling (or a rapid cooling rate) of the deposited weld metal from a liquid state to a solid state is greatly enhanced by utilizing the disclosed apparatus and method. The resulting weld metal is harder, and has less residual stress (or less tension) and, therefore, has a lesser tendency to crack.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. An apparatus for cooling a hard metal applied in a molten or semi-molten state to the surface of a workpiece, the apparatus comprising:
　　a chill block formed of a heat-conducting material,
　　a contact surface provided on the chill block for contacting the hard metal applied on the surface of the workpiece for cooling the hard metal,
　　a coolant passage in the chill block for conducting a cryogenic coolant through the chill block to cool the chill block, and
　　at least one ejector port in the chill block in communication with the coolant passage for ejecting cryogenic coolant from the chill block onto the hard metal for further cooling the hard metal,
　　wherein the chill block includes a protrusion on which the contact surface is formed, the protrusion extending below the coolant passage and the contact surface being positioned below the at least one ejector port.

2. The apparatus according to claim 1, wherein the heat conducting material of the chill block comprises copper.

3. The apparatus according to claim 1, wherein at least the contact surface has a width equal to or greater than a width of the hard metal to be cooled that is applied on the surface of the workpiece.

4. The apparatus according to claim 1, wherein the at least one ejector port is located on one side of the protrusion and wherein an application of hard metal on the metal substrate is configured to take place on an opposite side of the protrusion such that the hard metal is shielded from cryogenic coolant ejected from the at least one ejector port during hard metal cooling.

5. The apparatus according to claim 1, wherein the contact surface is rounded or chamfered at least in part in a direction permitting relative movement of the contact surface and the surface of the hard metal being cooled.

6. The apparatus according to claim 1, wherein a plurality of ejector ports are provided for ejecting cryogenic coolant from the chill block onto the hard metal.

7. The apparatus according to claim 1, wherein a plurality of ejectors ports are spaced from one another in a lateral direction across a width of the chill block and the hard metal being cooled.

8. The apparatus according to claim 1, wherein a plurality of ejector ports are spaced from one another in a longitudinal direction along a depth or length of the chill block and the hard metal being cooled.

9. A method for cooling a hard metal applied on a surface of a workpiece comprising:
applying a molten or semi-molten hard metal on a surface of a workpiece,
rapidly cooling the hard metal applied on the workpiece utilizing the apparatus of claim 1,
wherein a cryogenic coolant is conducted through the coolant passage in the chill block while the contact surface of the chill block is in contact with the hard metal and cryogenic coolant is ejected from the at least one ejector port in the chill block onto the hard metal,
wherein the molten or semi-molten hard metal is applied under protection of a shielding gas, and wherein the cryogenic coolant is ejected from the at least one ejector port of the chill block on a side of the contact surface opposite a side of the contact surface adjacent the gas-shielded application of the hard metal, the protrusion of the chill block serving as a shield to prevent the cryogenic coolant from mixing with the shielding gas.

10. The method according to claim 9, wherein the hard metal is applied to the surface of the workpiece by an arc welding process.

11. The method according to claim 9, wherein the contact surface of the chill block is contacted with the hard metal immediately after the hard metal is applied while the hard metal is still at least partially molten or semi-molten.

12. The method according to claim 9, wherein the surface of the workpiece to which the hard metal is to be applied is formed on an alloy steel.

13. The method according to claim 12, wherein the hard metal applied comprises an amorphous metal alloy.

14. The method according to claim 9, wherein the hard metal is progressively applied on the surface of the workpiece and the hard metal applied rapidly cooled by relatively moving the chill block and the workpiece with the contact surface of the chill block in contact with the hard metal as it is applied.

15. The method according to claim 9, wherein the cryogenic coolant is liquid nitrogen.

16. The method according to claim 9, including applying the contact surface on the hard metal while the hard metal is still at least partially molten or semi-molten to smooth and rapidly cool the hard metal.

17. A method of improving the application of hard metal to the surface of an alloy steel substrate comprising:
preheating the alloy steel substrate to a temperature within the range of 300 to 600 degrees Fahrenheit,
applying the hard metal to the surface of the preheated alloy steel substrate as a weld bead applied by an arc welding process,
rapidly cooling the weld bead utilizing a chill block in contact with the weld bead, wherein the utilizing the chill block comprises conducting a cryogenic coolant through a coolant passage in the chill block and ejecting the cryogenic coolant from an ejector port in the chill block across the width of the weld bead.

18. The method according to claim 17, wherein the steps of applying the hard metal and rapidly cooling the weld bead are performed progressively along the surface of the alloy steel substrate with relative movement of the chill block along the weld bead as the weld bead is applied by the arc welding process.

19. The method according to claim 17, wherein the weld bead is a wide weaved bead.

20. The method according to claim 17, wherein the weld bead is a stringer bead.

* * * * *